US010824552B2

(12) United States Patent
Devinoy et al.

(10) Patent No.: US 10,824,552 B2
(45) Date of Patent: Nov. 3, 2020

(54) PATCH MECHANISM IN EMBEDDED CONTROLLER FOR MEMORY ACCESS

(71) Applicant: NXP B.V., Eindhoven (NL)

(72) Inventors: Raymond Devinoy, Luc sur Mer (FR); Nicolas Laine, Caen (FR)

(73) Assignee: NXP B.V., Eindhoven (NL)

( * ) Notice: Subject to any disclaimer, the term of this patent is extended or adjusted under 35 U.S.C. 154(b) by 1231 days.

(21) Appl. No.: 13/866,358

(22) Filed: Apr. 19, 2013

(65) Prior Publication Data
US 2014/0149643 A1 May 29, 2014

(30) Foreign Application Priority Data
May 3, 2012 (EP) ................................. 12290151

(51) Int. Cl.
*G06F 12/02* (2006.01)
*G06F 8/65* (2018.01)

(52) U.S. Cl.
CPC ............ *G06F 12/0246* (2013.01); *G06F 8/66* (2013.01)

(58) Field of Classification Search
CPC ........ G06F 8/66–68; G06F 9/24; G06F 9/268; G06F 9/328; G06F 12/0638; G06F 12/0246
USPC ........................................................ 711/103
See application file for complete search history.

(56) References Cited

U.S. PATENT DOCUMENTS

| 4,982,360 A * | 1/1991 | Johnson .................... G06F 8/66 711/108 |
| 7,039,776 B2 * | 5/2006 | Wong et al. .............. G06F 9/44 |
| 7,062,598 B1 * | 6/2006 | Lapidus .................... G06F 8/66 711/102 |
| 7,844,962 B2 * | 11/2010 | Alexandre et al. ....... G06F 9/44 |
| 2002/0124161 A1 | 9/2002 | Moyer et al. |
| 2004/0210720 A1 * | 10/2004 | Wong ........................ G06F 8/60 711/132 |

(Continued)

FOREIGN PATENT DOCUMENTS

JP       2010/113549 A       5/2010

OTHER PUBLICATIONS

N. Mukherjee, A. Pogiel, J. Rajski and J. Tyszer, "Fault diagnosis for embedded read-only memories," 2009 International Test Conference, Austin, TX, 2009, pp. 1-10, doi: 10.1109/TEST.2009. 5355530.*

(Continued)

*Primary Examiner* — Pierre Miche Bataille (57) ABSTRACT

Various exemplary embodiments relate to a patch module connected between a data bus and a ROM memory controller. The patch module may include: at least one patch address register configured to store a ROM address; a patch data register corresponding to each patch address register, each patch data register configured for storing an instruction; an address comparator configured to compare an address received on the data bus with an address stored in each patch address register and output a first signal identifying a matching patch address register and a second signal indicating whether there is a matching address; and a first multiplexer configured to select the patch data register corresponding to the matching patch address register and output the contents of the patch data register to the data bus.

11 Claims, 4 Drawing Sheets

(56) References Cited

U.S. PATENT DOCUMENTS

| | | | |
|---|---|---|---|
| 2006/0107104 A1* | 5/2006 | Alexandre | G06F 9/30149 714/6.13 |
| 2006/0174244 A1* | 8/2006 | Woods | G06F 8/66 717/174 |
| 2006/0190765 A1* | 8/2006 | Grossier | G06F 8/66 714/6.13 |
| 2006/0242383 A1* | 10/2006 | Chen | G06F 12/0638 711/202 |
| 2007/0083713 A1* | 4/2007 | Torrini | G06F 9/268 711/125 |
| 2008/0112205 A1* | 5/2008 | Saado | G06F 9/328 365/94 |
| 2008/0155172 A1* | 6/2008 | Li | G06F 9/322 711/102 |
| 2009/0013124 A1* | 1/2009 | Itkin | G06F 9/32 711/103 |
| 2009/0031107 A1* | 1/2009 | Henry | G06F 9/268 712/32 |
| 2009/0031109 A1 | 1/2009 | Henry et al. | |
| 2010/0107149 A1* | 4/2010 | Hsu | G06F 9/328 717/168 |
| 2010/0180104 A1* | 7/2010 | Henry | G06F 8/66 712/208 |

OTHER PUBLICATIONS

"ROM Patching Mechanism Utilizing an Interrupt Facility", IBM Technical Disclosure Bulletin (TDB 04-82 p. 5956-5958).*
Communication pursuant to Article 94(3) EPC (dated Feb. 12, 2014).
Extended European Search Report for Patent Appln. No. 12290151.5 (dated Jan. 9, 2013).

* cited by examiner

PATCH MECHANISM IN EMBEDDED CONTROLLER FOR MEMORY ACCESS

CROSS-REFERENCE TO RELATED APPLICATIONS

This application claims the priority under 35 U.S.C. § 119 of European patent application no. 12290151.5, filed on May 3, 2012, the contents of which are incorporated by reference herein.

TECHNICAL FIELD

Various exemplary embodiments disclosed herein relate generally to integrated circuits.

BACKGROUND

An integrated circuit (IC) often includes a Read-Only Memory (ROM) that stores code used by the IC. The ROM is manufactured as part of the IC and the contents of the ROM are fixed at a tapeout stage of production. If issues are detected after tapeout, the contents of the ROM cannot be changed.

SUMMARY

In light of the present need for patching a ROM, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a patch module connected between a data bus and a ROM memory controller. The patch module may include: at least one patch address register configured to store a ROM address; a patch data register corresponding to each patch address register, each patch data register configured for storing an instruction; an address comparator configured to compare an address received on the data bus with an address stored in each patch address register and output a first signal identifying a matching patch address register and a second signal indicating whether there is a matching address; and a first multiplexer configured to select the patch data register corresponding to the first signal from the address comparator and output the contents of the patch data register to the data bus.

In various alternative embodiments, the patch module may further include a second multiplexer configured to select either the content of the patch data register or the content of the ROM from the ROM memory controller based on the second signal from the address comparator.

In various alternative embodiments, the patch module may further include a status register configured to indicate whether each address register is active.

In various alternative embodiments, the patch module may further include a test register configured to store an address of an address register that most recently arrived on the data bus.

In various alternative embodiments, the patch module is connected to a configuration bus configured to read the test register and write to the patch address register, patch data register, and status register.

In various alternative embodiments, the size of the patch address register is based on the size of the ROM and includes a sufficient number of bits such that each ROM address can be uniquely identified.

In various alternative embodiments, the patch address register is configured to store a least significant portion of an address.

In various alternative embodiments, the first multiplexer outputs the contents of a patch register before or at the same time that the memory controller outputs the contents of the ROM.

In various alternative embodiments, the patch data register stores an instruction to access an address of the system RAM.

In various alternative embodiments, the patch data register stores an instruction to access an address of a system electronically programmable non-volatile memory such as electronically erasable programmable read-only memory (EEPROM).

Various exemplary embodiments relate to an integrated circuit. The integrated circuit may include a Read-Only Memory (ROM); a data bus configured to assert a ROM address during an address phase and receives data during a data phase; a ROM controller configured to receive a ROM address and output data stored in the ROM; a patch module coupled between the data bus and the ROM controller. The patch module may include: at least one patch address register configured to store a ROM address; a patch data register corresponding to each patch address register, each patch data register configured for storing an instruction; and an address comparator configured to compare an address received on the data bus with an address stored in each patch address register and output a first signal identifying a matching patch address register and a second signal indicating whether there is a matching address; and a first multiplexer configured to select the patch data register corresponding to the first signal from the address comparator and output the contents of the patch data register to the data bus.

In various alternative embodiments, the IC further includes a RAM, wherein the patch data register stores an address in the RAM.

In various alternative embodiments, the IC further includes an EEPROM, wherein the patch data register stores an instruction to access an address in the EEPROM.

In various alternative embodiments, the patch module further comprises a second multiplexer configured to select either the content of the patch data register or the content of the ROM from the ROM memory controller based on whether the address received on the data bus matches an address in the at least one address register.

In various alternative embodiments, the patch module further comprises a status register configured to indicate whether each address register is active.

In various alternative embodiments, the patch module further comprises a test or debug register configured to store an identifier of an address register that most recently arrived on the data bus.

In various alternative embodiments, the patch module outputs the contents of the matching patch data register at the same time that the ROM controller outputs the contents ROM address.

In various alternative embodiments, the at least one patch data register is configured to store at least one of a branch instruction and an exception call instruction.

In various alternative embodiments, the IC further includes a CPU and the patch data register is configured to store an instruction executable by the CPU.

Various exemplary embodiments relate to a method of patching a Read Only Memory (ROM). The method may include; receiving an address from a bus; forwarding the received address to a ROM controller; comparing the received address to at least one stored address in a patch address register; if the received address matches a stored address, selecting data stored in a patch data register corresponding to the matching stored address; if the received address does not match a stored address, selecting data from the ROM controller; and providing the selected data to the bus.

In various alternative embodiments, the method may also include configuring the patch address register with an address corresponding to an error in the ROM and configuring the patch data register with an instruction to access a second address outside of the ROM.

In various alternative embodiments, the method may also include determining whether the matching patch address is enabled and selecting data from the ROM controller if the matching patch address is not enabled.

In various alternative embodiments, the method may also include storing an identifier of the matching patch address register.

It should be apparent that, in this manner, various exemplary embodiments enable a patch module for an integrated circuit. In particular, by supplying data from patch data registers instead of the ROM, the patch module may transparently correct errors in the ROM.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
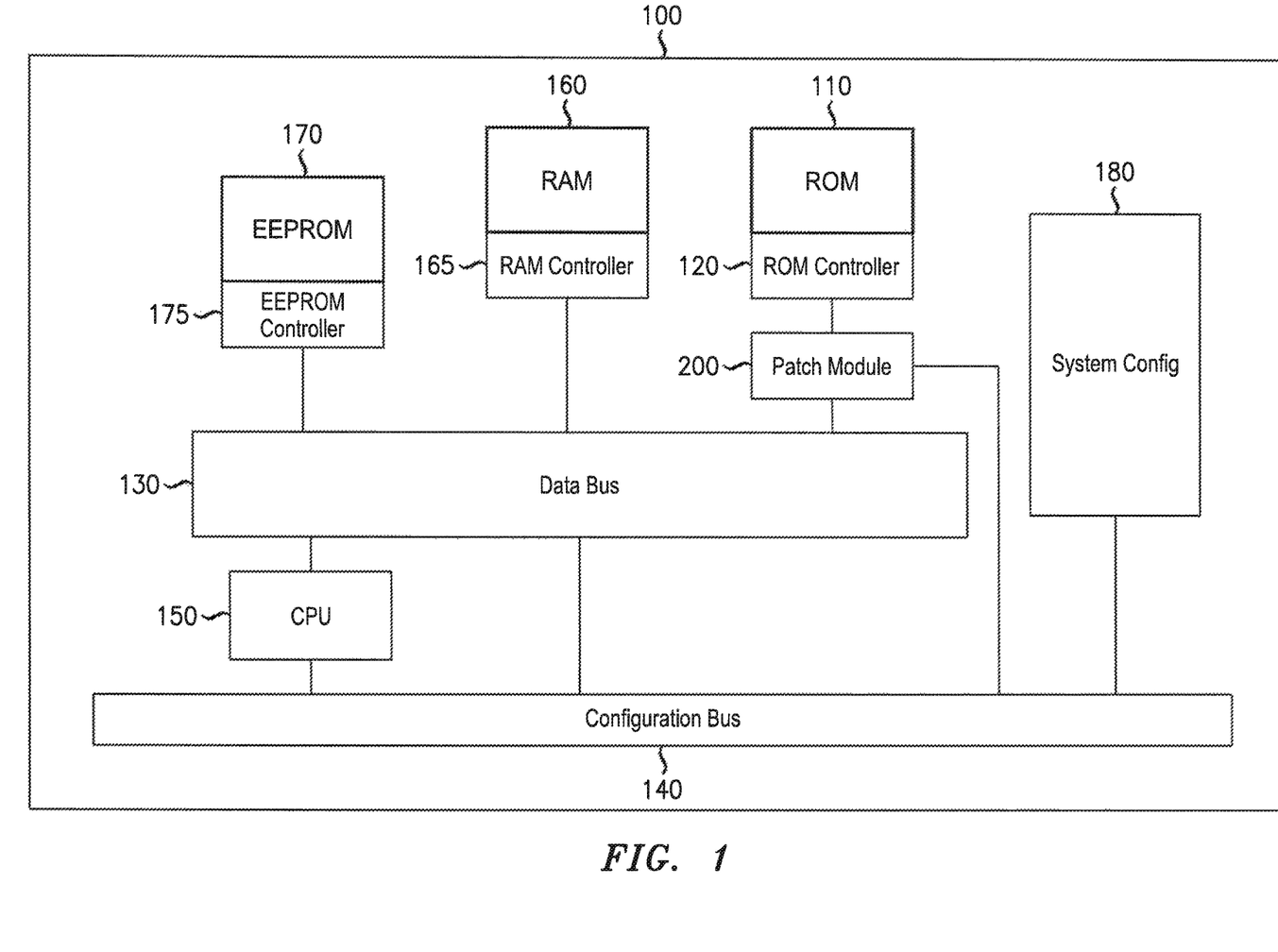
FIG. 1 illustrates various components of an integrated circuit.

FIG. 1 illustrates various components of an integrated circuit (IC) 100. IC 100 may include any integrated circuit with a ROM. IC 100 may be simplified to help understand the inventive concepts. In various exemplary embodiments, IC 100 may be a microcontroller or system-on-a-chip. IC 100 may include various components, such as, for example: patch module 200, ROM controller 120, ROM 125, data bus 130, configuration bus 140, CPU 150, RAM 165, RAM controller 165, EEPROM 170, EEPROM controller 175, and system configuration 180.

ROM 110 may be a Read-Only Memory that stores data and/or instructions for the IC 100. ROM 110 may be configured during manufacturing and may be unable to change. In various exemplary embodiments, ROM 110 may be the largest memory component of IC 100. ROM 110 may include the data and/or instructions for performing most of the functions of IC 100. In various exemplary embodiments, ROM 100 may store 96 kB of data and/or instructions.

ROM 110 may include one or more errors. An error may occur due to a mistake in the design of ROM 110. For example, an instruction in the ROM 100 may incorrectly perform a calculation. Alternatively, an error may be caused because ROM 100 has become outdated by a change in a protocol. For example, an encryption protocol may have changed. Because the content of ROM 110 was fixed at tapeout before manufacturing, any errors in ROM 110 may not be directly corrected.

ROM controller 120 may be a circuit configured to read data from ROM 110. ROM controller 120 may receive an input address from data bus 130 or patch module 200 during an address phase. ROM controller 120 may be configured to output content from ROM 110 corresponding to the received input address.

Data bus 130 may be any bus connected to a data source such as, for example, ROM 110, RAM 160, or EEPROM 170. Data bus 130 may carry an address during an address phase. Data bus 130 may carry data from a data source during a data phase. In various exemplary embodiments, data bus 130 may be an Advanced High-performance Bus (AHB) or an AHB-lite bus.

Configuration bus 140 may be any bus that carries configuration data. For example, configuration bus 140 may be connected to a configuration interface of patch module 200. Configuration bus 140 may be used to program patch addresses and patch data in patch module 200. In various exemplary embodiments, configuration bus 140 may be an Advanced Peripheral Bus (APB).

CPU 150 may be a central processing unit that executes instructions. In various exemplary embodiments, CPU 150 is a 32-bit processor. CPU 150 may follow a reduced instruction set computing (RISC) architecture such as Advanced RISC Machine (ARM) architecture. As will be explained in further detail below, a patch data register may store generic instructions that may be executed by CPU 150. For example, CPU 150 may execute a branch instruction or exception call received from the patch module 200.

RAM 160 may be a random-access memory. RAM 160 may be a volatile memory that temporarily stores data during operation of IC 100. In various exemplary embodiments, RAM 160 may be a static-RAM (SRAM). In various exemplary embodiments, RAM 160 may be smaller than ROM 110. For example, RAM 160 may be only 6 kB. If patch module 200 is used to patch an error in ROM 110, RAM 160 may store patch data or instructions. The patch data or instructions may be loaded into RAM 160 during boot up.

RAM controller 165 may be a circuit configured to read or write data in RAM 160. RAM controller 165 may receive an input address from data bus 130 during an address phase. RAM controller 165 may be configured to write content to or output content from RAM 160 corresponding to the received input address.

EEPROM 170 may be an electronically erasable programmable read only memory. EEPROM 170 may be a non-volatile memory that may be programmed during operation of IC 100. In various exemplary embodiments, EEPROM 170 may be smaller than ROM 110. For example, EEPROM 170 may be 48 kB. If patch module 200 is used to patch an error in ROM 110, EEPROM 170 may store patch data or instructions. The patch data or instructions may be loaded once into EEPROM 170. Using EEPROM 170 to store patch data may reduce load time during boot up and allow the IC 100 to be ready faster.

EEPROM controller 175 may be a circuit configured to read or write data in EEPROM 170. EEPROM controller 175 may receive an input address from data bus 130 during an address phase. EEPROM controller 175 may be configured to write content to or output content from RAM 160 corresponding to the received input address. EEPROM controller 175 may also receive an instruction to erase part of EEPROM 170.

System configuration 180 may be a circuit configured to configure IC 100. For example, system configuration 180 may include a debug interface for managing patch module 200. System configuration 180 may send configuration data to patch module 200 via configuration bus 140. For example, system configuration 180 may load patch addresses and patch data into patch module 200 upon power up or reset.

Patch module 200 may be a circuit configured to patch errors in ROM 110. Patch module 200 may be coupled between ROM controller 120 and data bus 130. Patch module 200 may transparently patch errors in ROM 110 by replacing the content of ROM 110 with patch data stored in patch module 200 at the same time ROM controller 120 outputs the content of ROM 110. Patch module 200 may be configured to receive an address from data bus 130. Patch module 200 may determine whether the received address has been stored as a patch address. If the received address is a patch address, patch module 200 may output stored patch data to data bus 130 instead of the content output by ROM controller 120. The patch data may include any data or instruction that corrects the error in ROM 110. For example, the patch data may include a branch instruction or exception call that causes CPU 150 to access a different memory location such as RAM 160 or EEPROM 170. As another example, the error is caused by a single ROM address containing incorrect data, the patch data may simply provide the correct data. Because patch module 200 may transparently replace ROM data with patch data, patch module 200 provides a patch programmer with flexibility in implementing a patch. The operation of patch module 200 will be described in further detail below regarding FIGS. 2-3.

Figure 2:
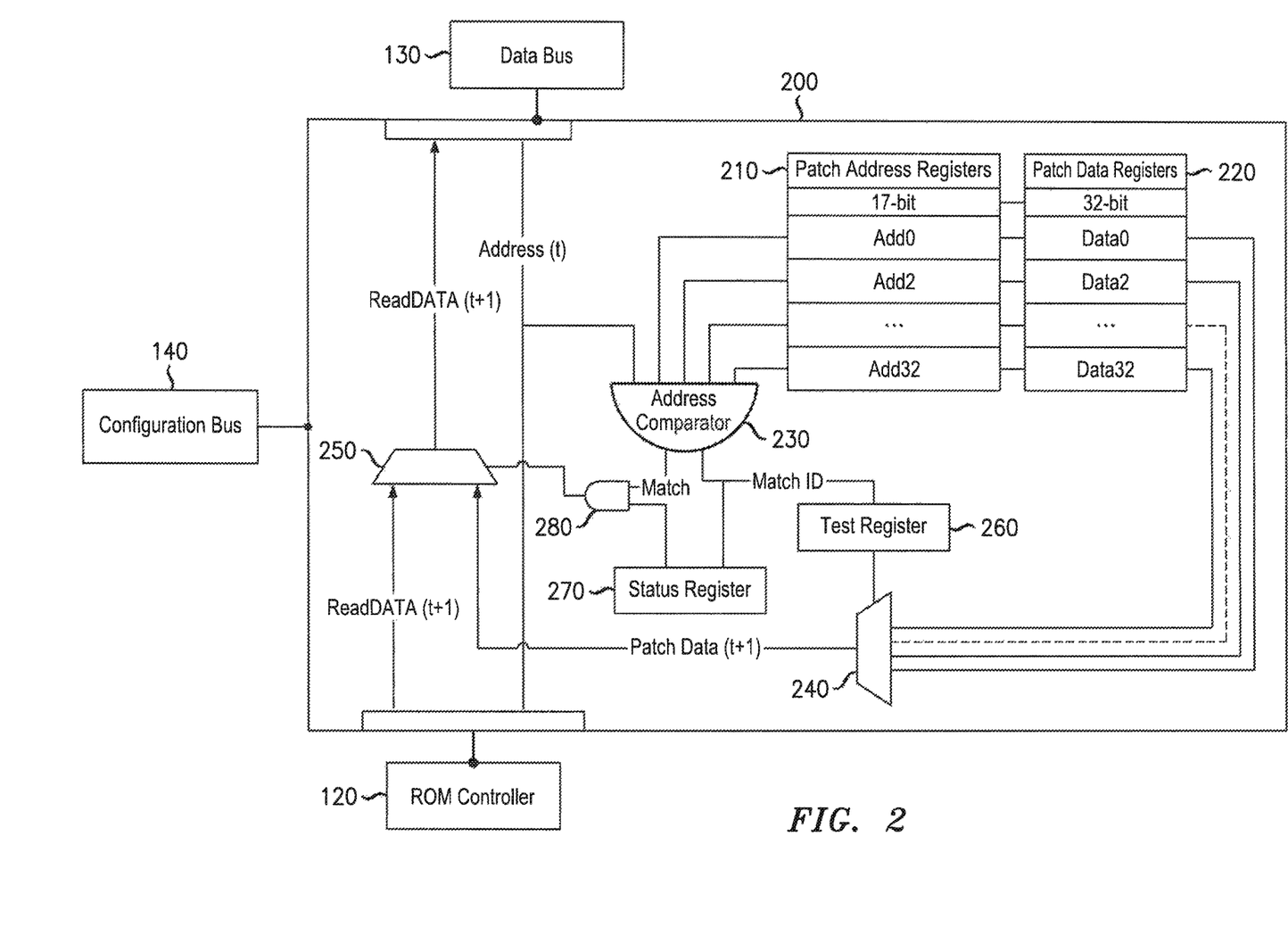
FIG. 2 illustrates a diagram of an exemplary patch module.

FIG. 2 illustrates a diagram of an exemplary patch module 200. As described above, patch module 200 may be a circuit coupled between ROM controller 120 and data bus 130. The input of data bus 130 may be coupled to ROM controller 120 without modification so that ROM controller 120 receives an address on data bus 130 without modification. Patch module 200 may also be coupled to configuration bus 140. Patch module 200 may include: patch address registers 210, patch data registers 220, address comparator 230, first multiplexer 240, second multiplexer 250, test register 260, status register 270, and logic gate 280.

Patch address registers 210 may include data registers configured to store an address or portion of an address. The addresses stored in patch address registers 210 may correspond to addresses in ROM 110. In various exemplary embodiments, patch address registers 210 may store a least significant bits (LSB) portion of the memory address. The size of each register may be determined by the size of the ROM. For example, if ROM 110 is 96 kB and each ROM address stores 32 bits, each patch address register may store a 15-bit portion of the address. In this way, the size of the patch address registers 210 and the complexity of patch module 200 may be minimized. Also, each ROM address may be separately patched, including consecutive ROM addresses. Patch address registers 210 may be programmed by configuration bus 140.

Patch data registers 220 may be configured to store patch data for correcting an error in ROM 110. Each patch register may store a number of bits corresponding to a ROM address content, a bus width, or user code instruction size. The data in patch data registers 220 may transparently replace data stored at an address in ROM 110. In various exemplary embodiments, patch data registers 220 may each store 32 bits of patch data. Patch data registers 220 may be programmed by configuration bus 140.

Address comparator 230 may include a circuit configured to receive input from a plurality of patch address registers 220 and an address from data bus 130, and to output a first signal identifying a matching patch address register and a second signal indicating whether the address from data bus 130 matches any of the patch address registers 220. The first output signal may be coupled to the first multiplexer 240. The first output signal may be multiple bits corresponding to the number of patch address registers 220. For example, if there are 32 patch address registers, the first output signal may be 5 bits. The second output signal may be a single bit and be coupled to the second multiplexer 250.

First multiplexer 240 may be a circuit or multiplexer configured to select the content of one of patch data registers 230. First multiplexer 240 may receive the first output signal of address comparator 230 as a selection input. First multiplexer 240 may output the content of the selected patch data register 220.

Second multiplexer 250 may be a circuit or multiplexer configured to select the patch data output from the first multiplexer 240 or the ROM data output by ROM controller 120. Second multiplexer 250 may receive the second output of address comparator 230 as a selection input. Second multiplexer 250 may output the selected data to data bus 130. It may be noted that selection of data by the second multiplexer and patch module 200 may be transparent to data bus 130. That is, data bus 130 may receive the output of second multiplexer 250 at the same time as it would otherwise receive the output of ROM controller 230 without any indication of what data second multiplexer 250 has selected.

Test or debug register 260 may be a register for storing an indication of the most recently selected patch address register. In various exemplary embodiments, test register 260 may be coupled between address comparator 230 and first multiplexer 240. Test register 260 may store the most recently output match id. Alternatively, test register 260 may be configured to store the patch address stored in the most recently selected patch address register 210. Test register 260 may be read by configuration bus 140. The data stored in test register 260 may be useful for determining whether patch module 200 is correctly detecting patch addresses and outputting patch data.

Status register 270 may include one or more registers for storing an indication of whether patch address registers 220 and patch data registers 230 are active. A patch address register may be active when it has been programmed with a patch address. Status register 270 may also be used to activate or deactivate patch addresses. Status register 270 may be configured using configuration bus 140. In various exemplary embodiments, status register 270 may include a bit for each address register 220. Status register 270 may include a multiplexer configured to select a bit indicating the status of the matching register based on the first output of the address comparator 230. Status register 270 may be coupled to logic gate 280 along with the second output of address comparator 230. Accordingly, logic gate 280 may output a signal indicating that a matching patch address was found only when the matching patch address register 220 is active.

Figure 3:
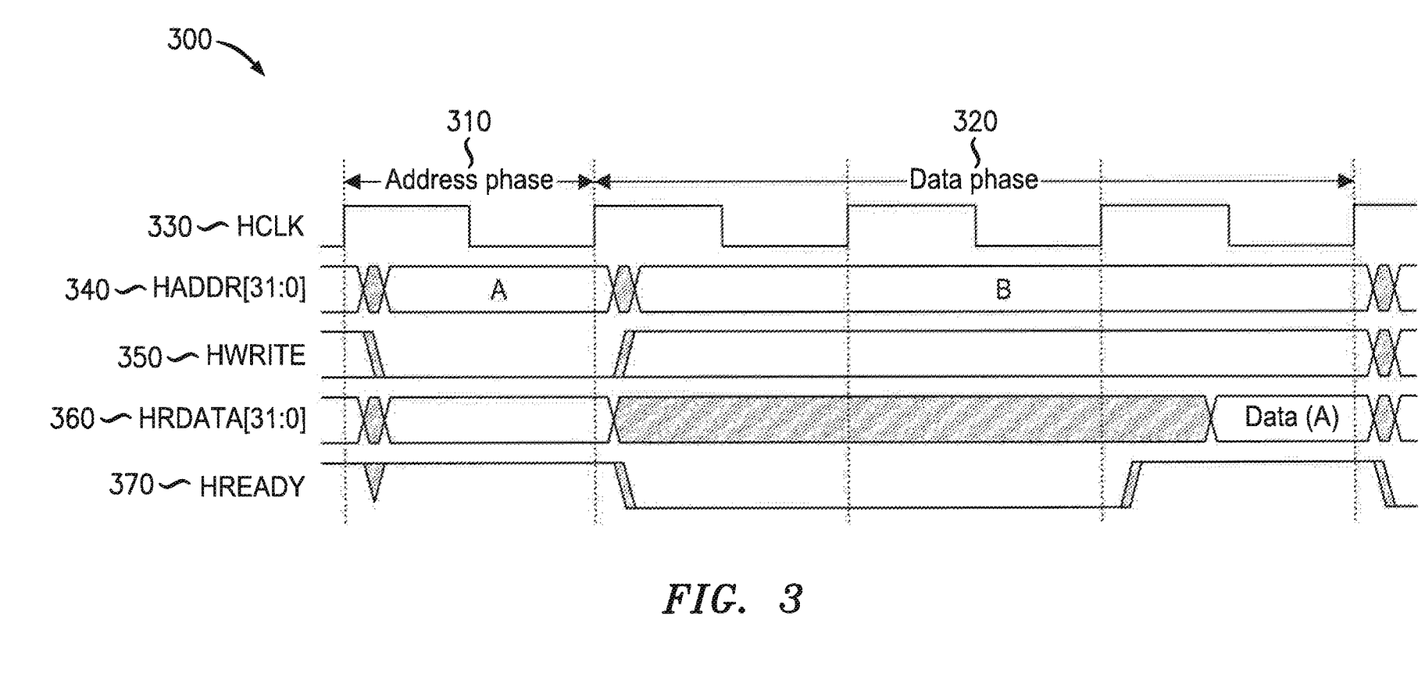
FIG. 3 illustrates a timing diagram of the integrated circuit and patch module.

FIG. 3 illustrates a timing diagram 300 of the integrated circuit 100 and patch module 200. Timing diagram 300 may illustrate the status of various signals at different times. In particular, timing diagram 300 may illustrate the status during an address phase 310 and a data phase 320. Timing diagram 300 may illustrate how patch module 200 may supply HRDATA signal 360 at the same time that ROM controller 120 may supply data from ROM 110.

HCLK signal 330 may show a clock signal. The clock signal may output a square wave each clock cycle. In various exemplary embodiments, the address phase 310 may be a single clock cycle and the data phase may be multiple clock cycles.

HADDR signal 340 may show the status of the address bus. During the address phase, the address A may be asserted. During the data phase, the address B may be asserted. Patch module 200 and ROM controller 120 may receive an address during the address phase.

HWRITE signal 350 may show a signal indicating that a memory may be written. The memory may be written during data phase 320, but not during the address phase 310.

HRDATA signal 360 may show a signal indicating the output of patch module 200. During the address phase 310, HRDATA signal 360 may produce no signal. During a first portion of data phase 320, HRDATA signal 360 may maintain selected data from patch data registers 220. After the HREADY signal 370 goes valid, patch module 200 may stop signaling the patch data. The data from ROM 110 may be available at the end of the data phase.

HREADY signal 370 may show a signal from ROM controller 120 that indicates that the ROM controller 120 has delivered data to the bus during a read transaction.

Figure 4:
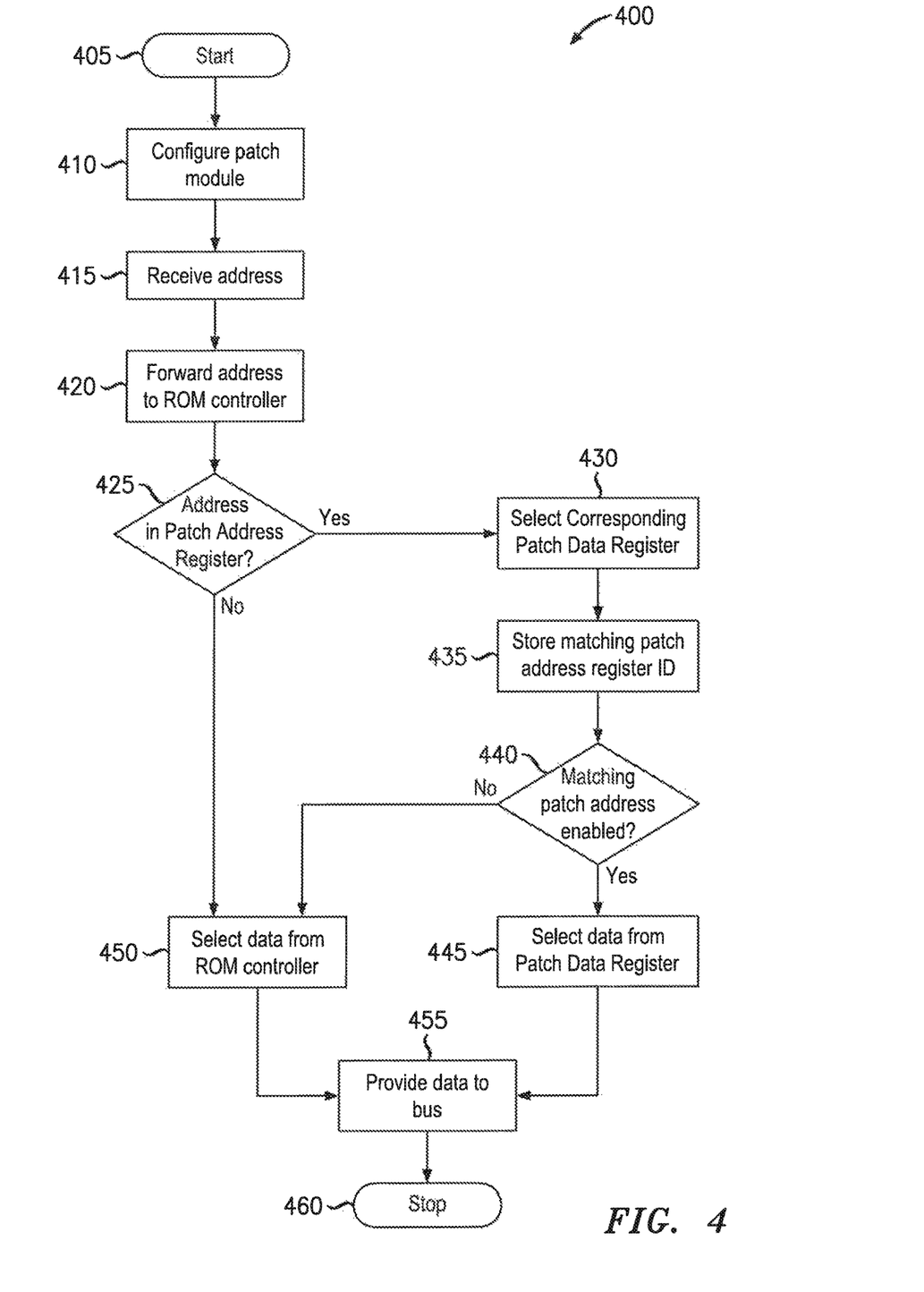
FIG. 4 illustrates a flowchart showing an exemplary method of patching a ROM.

FIG. 4 illustrates a flowchart showing an exemplary method 400 for patching a ROM. Method 400 may be performed by the various components of patch module 200. Method 400 may begin at step 405 and proceed to step 410.

In step 410, patch module 200 may be configured via a configuration bus. 150. Patch module 200 may be configured by commands to load data into various registers. Patch module 200 may load ROM addresses into patch address registers 210. Patch module 200 may load instructions or data into patch data registers 220. Patch module 200 may load status indicator bits into status register 270. Patch module 200 may also provide an indication of a most recently matching patch address register to configuration bus 140. The method 400 may proceed to step 415.

In step 415 patch address module 200 may receive an address from a bus, such as, data bus 140. The received address may be an address of ROM 110. The method 400 may proceed to step 415, where patch module 200 may forward the received address to ROM controller 120. Patch module 200 may transparently forward the address to ROM controller 120. The method 400 may proceed to step 425.

In step 425, patch module 200 may compare the received address with the addresses in patch address registers 210. If any of the addresses in patch address registers 210 match the received address, method 400 may proceed to step 430. If there are no matching addresses in patch address registers 210, the method 400 may proceed to step 450.

In step 430, patch module 200 may select a patch data register 220 corresponding to the matching patch address register 220. The method 400 may proceed to step 435, where patch module 200 may store an identifier of the matching patch address register. For example, patch module 200 may store the location of the matching patch address register within patch address registers 210 or the matching address. The method 400 may proceed to step 440.

In step 440, patch module 200 may determine whether the matching patch address is enabled. Patch module 200 may check the patch address register with a status register 270. If status register 270 indicates that the matching patch address register is enabled, the method 400 may proceed to step 445. If the status register 270 indicates that the matching patch address register is not enabled, the method 400 may proceed to step 450.

In step 445, patch module 200 may select data from the corresponding patch data register. Alternatively, in step 450, patch module 200 may select data from the ROM controller 120. The method 400 may then proceed to step 455, where the patch module 200 may provide the selected data to data bus 140. The method 400 may proceed to step 460, where the method ends. The method 400 may be repeated for each address received from bus 140.

According to the foregoing, various exemplary embodiments provide for a patch module for an integrated circuit. In particular, by supplying data from patch data registers instead of the ROM, the patch module may transparently correct errors in the ROM.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A patch module connected between a data bus and a Read-Only Memory (ROM) memory controller, the ROM memory controller further connected to a ROM memory array addressable by a plurality of ROM addresses, the patch module comprising:
   a plurality of patch address registers, each patch address register configured to store a ROM address;
   a plurality of patch data registers, each patch data register corresponding to each patch address register, wherein each of the plurality of patch data registers is configured to store an instruction, each instruction having the same datatype, wherein each instruction is configured to replace data at the ROM address stored in the corresponding patch address register;
   an address comparator configured to compare an address received on the data bus with each ROM address stored in the plurality of patch address registers and output a first signal and a second signal, wherein
      the second signal is activated when the ROM address stored by one of the plurality of patch address registers matches the address received on the data bus, and the first signal comprises an identifier of a particular patch address register that stores the stored ROM address that matches the address received on the data bus;

a first multiplexer and a second multiplexer, wherein
the first multiplexer has a plurality of inputs, each input connected to a respective one of the plurality of patch data registers, wherein the first multiplexer is configured to select the instruction from one of the plurality of patch data registers that corresponds to, respectively, one of the plurality patch address registers identified in the first signal,
the second multiplexer has a first input connected to an output of the first multiplexer and a second input connected to an output of the ROM memory array via the ROM memory controller, wherein the second multiplexer is configured to select the first input in response to the second signal being activated, wherein an output of the second multiplexer is connected to the data bus;

wherein the patch module is a component of an integrated circuit including the ROM memory array, the data bus, and the ROM memory controller.

2. The patch module of claim 1, further comprising:
a status register configured to indicate whether each patch address register is active, wherein the address comparator is further configured to ignore any ROM address stored in a patch address register that is indicated as inactive.

3. The patch module of claim 2, wherein the status register includes a respective bit associated with each patch address register, each respective bit indicating a status for each patch address register.

4. The patch module of claim 2, further comprising:
a configuration bus configured to:
write a first ROM address to a first patch address register, wherein the first ROM address corresponds to a location of an error detected in the ROM memory array, wherein the location in the ROM memory array stores a ROM instruction;
write a first replacement instruction to a first patch data register associated with the first patch address register;
activate a first status register bit associated with the first patch address register.

5. The patch module of claim 1, further comprising:
a test register configured to store the identifier of the particular patch address register, wherein the patch module is further connected to a configuration bus configured to read the test register.

6. The patch module of claim 1, wherein each patch address register is configured to store a least significant portion of an address.

7. The patch module of claim 1, wherein the first multiplexer is configured to output the content of the particular patch data register before or at the same time that the ROM controller is configured to output content of the ROM memory array.

8. The patch module of claim 1, wherein the integrated circuit includes a CPU and each patch data register stores an instruction executable by the CPU.

9. The patch module of claim 1, wherein
each ROM address stored in the plurality of patch address registers corresponds to a location of an error detected in the ROM memory array, and
each instruction stored in the plurality of patch data registers corresponds to a replacement instruction for the location of the error.

10. The patch module of claim 1, wherein the integrated circuit further includes an electronically erasable programmable read only memory (EEPROM), wherein
content from the ROM memory array is configured to be output by the ROM memory controller for EEPROM programming during boot up, and
the patch module is configured to output content from at least one patch data register to replace at least a portion of content from the ROM memory array, wherein the content from the at least one patch data register comprises a replacement instruction configured to access an address in the EEPROM.

11. A patch module connected between a data bus and a Read-Only Memory (ROM) memory controller, the ROM memory controller further connected to a ROM memory array addressable by a plurality of ROM addresses, the patch module comprising:
a plurality of patch address registers, each patch address register configured to store a ROM address;
a plurality of patch data registers, each patch data register corresponding to each patch address register, each patch data register configured to store an instruction;
an address comparator configured to compare an address received on the data bus with each ROM address stored in the plurality of patch address registers and output a first signal and a second signal, wherein
the second signal is activated when a ROM address stored by one of the plurality of patch address registers matches the address received on the data bus, and
the first signal comprises an identifier of a particular patch address register that stores the ROM address that matches the address received on the data bus;
a first multiplexer and a second multiplexer, wherein
the first multiplexer has a plurality of inputs, each input connected to a respective one of the plurality of patch data registers, wherein the first multiplexer is configured to select content of a particular patch data register that corresponds to, respectively, the particular patch address register identified in the first signal,
the second multiplexer has a first input connected to an output of the first multiplexer and a second input connected to an output of the ROM memory array via the ROM memory controller, wherein the second multiplexer is configured to select the first input in response to the second signal being activated, wherein an output of the second multiplexer is connected to the data bus;
wherein the patch module is a component of an integrated circuit including the ROM memory array, the data bus, and the ROM memory controller; and
wherein the content of the particular patch data register is configured to be output on the data bus, based on the second signal being activated and the identifier of the particular patch address register in the first signal.

* * * * *